United States Defensive Publication [19] (H) [11] T971,006

Smith [43] June 6, 1978

[54] PURIFICATION OF PHOSPHORIC ACID SOLUTIONS

[75] Inventor: Anthony J. Smith, Florence, Ala.

[73] Assignee: Tennessee Valley Authority

[21] Appl. No.: 833,191

[22] Filed: Sep. 14, 1977

[51] Int. Cl.[2] ..... C01B 25/16

[52] U.S. Cl. ..... 423/321 R; 423/8

[57] ABSTRACT

An improved method of purifying wet-process phosphoric acid by sedimentation, in which the crude acid is intimately mixed with an appropriate amount of finely divided silica or silicate. The result is that the absolute magnitude of the zeta potential of the suspended solids, particularly humus and gypsum, decreases to a value that allows them to aggregate, settle rapidly, and be removed by conventional methods. The Si:F ratio is increased, effecting a reduction of fluorine contamination. The rate of growth of gypsum crystals is increased, reducing the amount of post-precipitation of gypsum and other particulates. Because the rate of settlement is increased, the holding time prior to further processing, such as concentrating to merchant-grade acid, is decreased, reducing storage and space requirements and associated capital investment as well as investment in product inventory. The sedimentation of solids concentrates and purifies the acid, allowing production of liquid and solid fertilizers containing fewer impurities. The removal of solids, particularly humus, allows the efficient separation and recovery of organic solvent when uranium is recovered from the impure acid by solvent-solvent extraction methods, minimizing the loss of solvent.

17 Claims, 1 Sheet Drawing,

20 Pages Specification

The file of this unexamined application may be inspected and copies thereof may be purchased (849 O.G. 1221, Apr. 9, 1968).

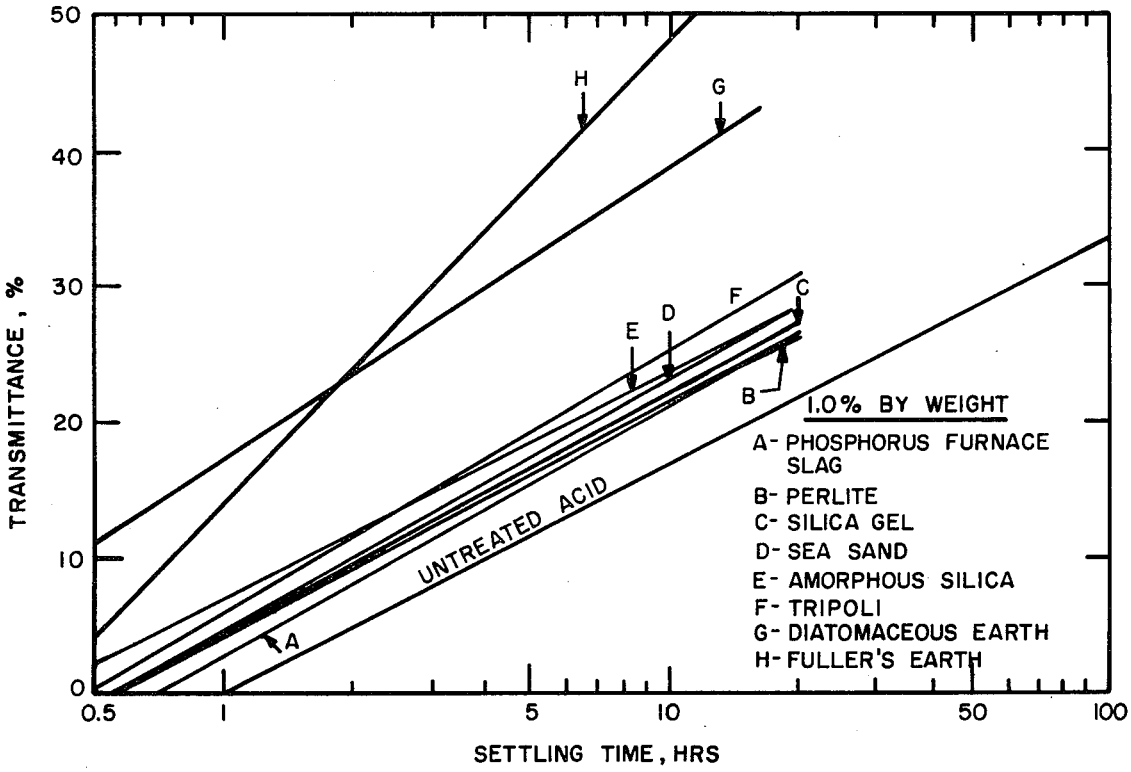

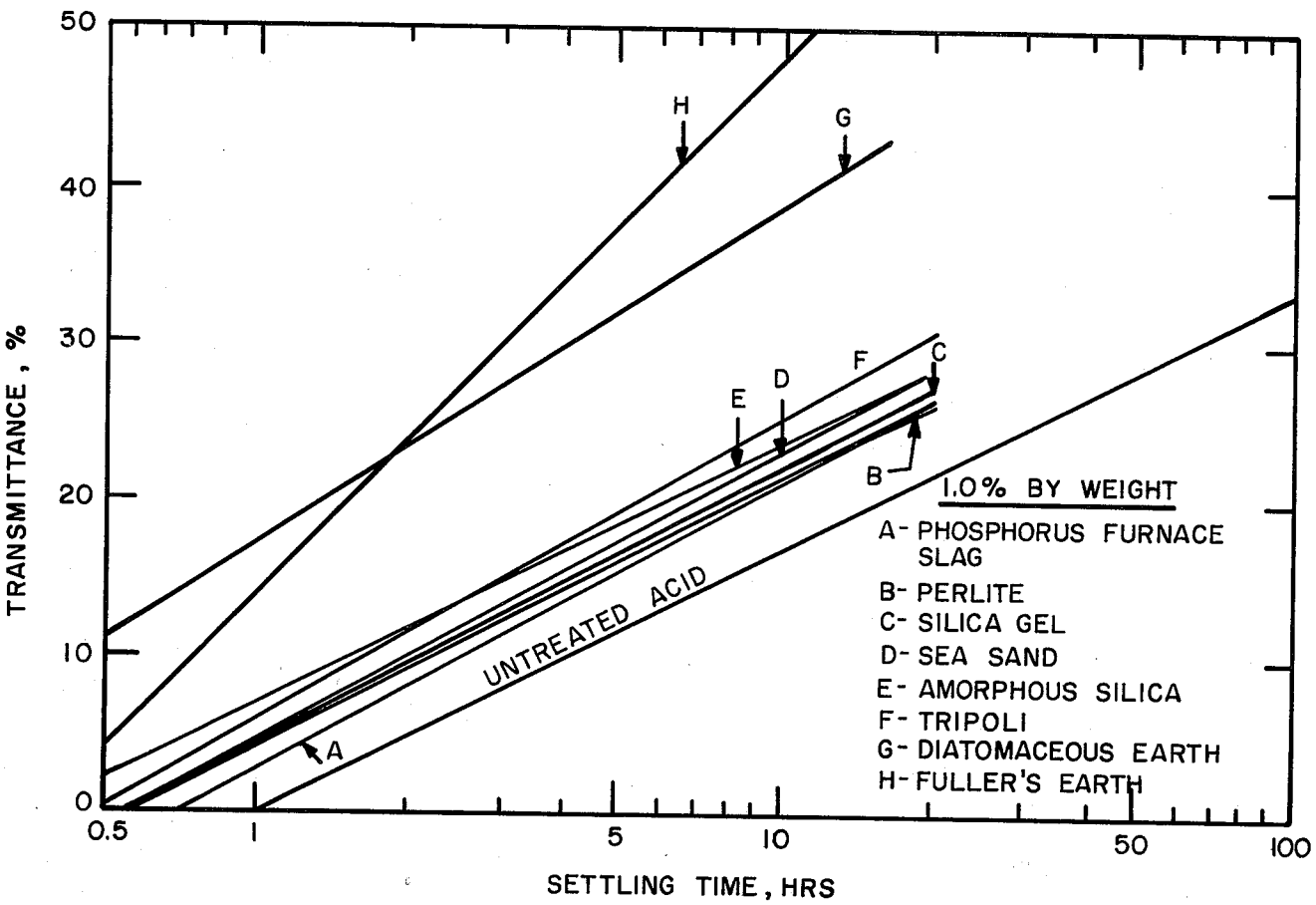
TRANSMITTANCE, %
50
40
30
20
10
0
0.5
1
5
10
50
100
SETTLING TIME, HRS
1.0% BY WEIGHT
A- PHOSPHORUS FURNACE SLAG
B- PERLITE
C- SILICA GEL
D- SEA SAND
E- AMORPHOUS SILICA
F- TRIPOLI
G- DIATOMACEOUS EARTH
H- FULLER'S EARTH
UNTREATED ACID
A
B
C
D
E
F
G
H